United States Patent [19]
Buljan et al.

[11] Patent Number: 5,271,758
[45] Date of Patent: Dec. 21, 1993

[54] ALUMINA CERAMIC-METAL ARTICLES

[75] Inventors: Sergej T. Buljan, Acton; Helmut Lingertat, Dorchester; Steven F. Wayne, Scituate, all of Mass.

[73] Assignee: Valenite Inc., Troy, Mich.

[21] Appl. No.: 701,302

[22] Filed: May 13, 1991

Related U.S. Application Data

[63] Continuation-in-part of Ser. No. 595,065, Oct. 10, 1990, abandoned.

[51] Int. Cl.$^5$ .......................................... C22C 29/12
[52] U.S. Cl. ........................ 75/232; 75/235; 75/237; 75/241; 75/245; 75/249; 75/950
[58] Field of Search ............ 75/230, 231, 232, 233, 75/234, 235, 236, 237, 238, 241, 244, 249, 245, 950

[56] References Cited

U.S. PATENT DOCUMENTS

| | | | |
|---|---|---|---|
| 4,497,228 | 2/1985 | Sarin et al. | 82/1 |
| 4,919,718 | 4/1990 | Tiegs et al. | 75/232 |
| 4,990,181 | 2/1991 | Pierotti et al. | 75/246 |
| 5,015,290 | 5/1991 | Tiegs et al. | 75/232 |
| 5,089,047 | 2/1992 | Buljan et al. | 75/236 |

FOREIGN PATENT DOCUMENTS

| | | |
|---|---|---|
| 0062311 | 10/1982 | European Pat. Off. |
| 49127806 | 12/1974 | Japan |
| 2071908 | 3/1990 | Japan |

Primary Examiner—Donald P. Walsh
Assistant Examiner—Daniel Jenkins
Attorney, Agent, or Firm—Harness, Dickey & Pierce

[57] ABSTRACT

A dense cermet article including about 44–93% of a granular first hard phase, about 4–44% of a granular second hard phase, and about 2–20% of a metal phase, all expressed in % by volume. The first hard phase consists essentially of alumina and from 0% to less than 5% of one or more oxides selected from magnesia, zirconia, yttria, hafnia, and silica. The second hard phase consists essentially of a hard refractory carbide, nitride, or boride, or mixture or solid solution thereof. Preferred materials for inclusion in the second hard phase are titanium carbide, hafnium carbide, tantalum carbide, tantalum nitride, tungsten carbide, titanium diboride, and boron carbide. The metal phase consists essentially of a combination of nickel and aluminum having a ratio of nickel to aluminum of from about 85:15 to about 88:12, and 0–5% of an additive selected from the group consisting of titanium, zirconium, hafnium, vanadium, niobium, tantalum, chromium, molybdenum, cobalt, boron, and/or carbon. The preferred metal phase is substantially of the $Ni_3Al$ ordered crystal structure.

19 Claims, 1 Drawing Sheet

ALUMINA CERAMIC-METAL ARTICLES

CROSS REFERENCE TO RELATED APPLICATIONS

This application is a continuation-in-part of commonly assigned, copending U.S. patent application Ser. No. 07/595,065 filed Oct. 10, 1990, now abandoned, by the same Applicants.

This application is also related to commonly assigned U.S. patent application Ser. Nos. 07/576,241, filed Aug. 31, 1990 and now abandoned; 07/632,237 and 07/632,238, both filed Dec. 20, 1990; 07/635,408, filed Dec. 21, 1990; and 07/693,492, a continuation-in-part of application Ser. No. 07/595,065, and filed Apr. 30, 1991; all also by the same Applicants. Applications Ser. No. 07/595,065, 07/576,241, 07/632,237, 07/632,238, 07/635,408, and (90-3-908) are incorporated herein by reference.

BACKGROUND OF THE INVENTION

This invention relates to alumina ceramic articles containing dispersed metal for use as cutting tools, wear parts, and the like. In particular the invention relates to such articles containing a metal including both nickel and aluminum.

Ceramic-metal (cermet) tools for steel machining have greatly improved the productivity and efficiency of the metal removal process. The performance of a number of cermet materials, which principally are based on refractory metal carbides or nitrides bonded with cobalt, nickel, molybdenum, or alloy binders, inherently is limited by the chemical interaction between the hard phase and steel workpiece materials. This becomes particularly evident as increased cutting speeds generate more heat, increasing the chemical reactivity of both the tool material and the workpiece. Such chemical reactions between the cutting tool and steel workpiece accelerate wear and reduce crater resistance of the tool.

Attempts have been made to utilize alumina ceramics and alumina-based composites such as alumina-titanium carbide composites for use as cutting tools for steel machining. The broader use of this class of materials, however, has been restricted by their inherently low fracture toughness.

Accordingly, it would be of great value to find a cermet material suitable for cutting tool use which exhibits improved fracture toughness compared to known alumina-titanium carbide composites as well as improved chemical wear resistance and performance compared to conventional cermet cutting tool materials. Such a new and improved cermet material is described herein.

SUMMARY OF THE INVENTION

In one aspect, the present invention is a ceramic-metal article including about 44-93% of a granular first hard phase, about 4-44% of a granular second hard phase, and about 2-20% of a metal phase. The first hard phase consists essentially of alumina and from 0% to less than 5% by volume of one or more oxides selected from magnesia, zirconia, yttria, hafnia, and silica. The second hard phase consists essentially of one or more ceramic materials selected from the hard refractory carbides, nitrides, and borides, and combinations thereof. The metal phase consists essentially of a combination of nickel and aluminum having a ratio of nickel to aluminum of from about 85:15 to about 88:12 by weight, and 0-5% of an additive selected from the group consisting of titanium, zirconium, hafnium, vanadium, niobium, tantalum, chromium, molybdenum, tungsten, cobalt, boron, or carbon, or combinations thereof. The article has a density of at least about 95% of theoretical. All unspecified component percents are expressed in % by volume.

In another narrower aspect, the invention is a ceramic-metal article including about 44-93% of a granular first hard phase, about 4-44% of a granular second hard phase, and about 4-12% of a metal phase. The first hard phase consists essentially of alumina and 0% to less than 5% of one or more oxides selected from magnesia, zirconia, yttria, hafnia, and silica. The second hard phase consists essentially of one or more ceramic materials selected from hard refractory titanium carbide, hafnium carbide, tantalum carbide, tantalum nitride, tungsten carbide, titanium diboride, boron carbide, and combinations thereof. The metal phase consists essentially of a combination of nickel and aluminum having a ratio of nickel to aluminum of from about 85:15 to about 88:12 by weight and 0-5% of an additive selected from the group consisting of titanium, zirconium, hafnium, vanadium, niobium, tantalum, chromium, molybdenum, tungsten, cobalt, boron, or carbon, or combinations thereof. The article has a density of at least about 95% of theoretical, and all unspecified component percents are expressed in % by volume.

In yet another aspect, the invention is a ceramic-metal article including about 44-93% of a granular first hard phase, about 4-44% of a granular second hard phase, and about 2-12% of a metal phase. The first hard phase consists essentially of alumina and from 0% to less than 5% by volume of one or more oxides selected from magnesia, zirconia, yttria, hafnia, and silica. The second hard phase consists essentially of one or more ceramic materials selected from the hard refractory carbides, nitrides, and borides, and combinations thereof. The metal phase consists essentially of a combination of nickel and aluminum having a ratio of nickel to aluminum of from about 85:15 to about 88:12 by weight, and 0-5% of an additive selected from the group consisting of titanium, zirconium, hafnium, vanadium, niobium, tantalum, chromium, molybdenum, tungsten, cobalt, boron, or carbon, or combinations thereof. The metal phase is a non-continuous, dispersed metal phase, and at least a major portion of the non-continuous, dispersed metal phase is segregated at triple points defined by grain surfaces of the granular hard phases. The article has a density of at least about 95% of theoretical. All unspecified component percents are expressed in % by volume.

In other narrower, aspects of the invention, the metal phase includes a combination of a $Ni_3Al$ ordered crystal structure, or a $Ni_3Al$ ordered crystal structure coexistent with or modified by said additive, and one or more nickel-aluminum alloys. This metal phase combination may include about 40-80% by volume of said $Ni_3Al$ ordered crystal structure or said $Ni_3Al$ ordered crystal structure coexistent with or modified by said additive.

BRIEF DESCRIPTION OF THE DRAWINGS

For a better understanding of the present invention, together with other objects, advantages and capabilities thereof, reference is made to the following Description and appended Claims, together with the Drawings, in which:

DETAILED DESCRIPTION OF THE PREFERRED EMBODIMENTS

Figure 1:
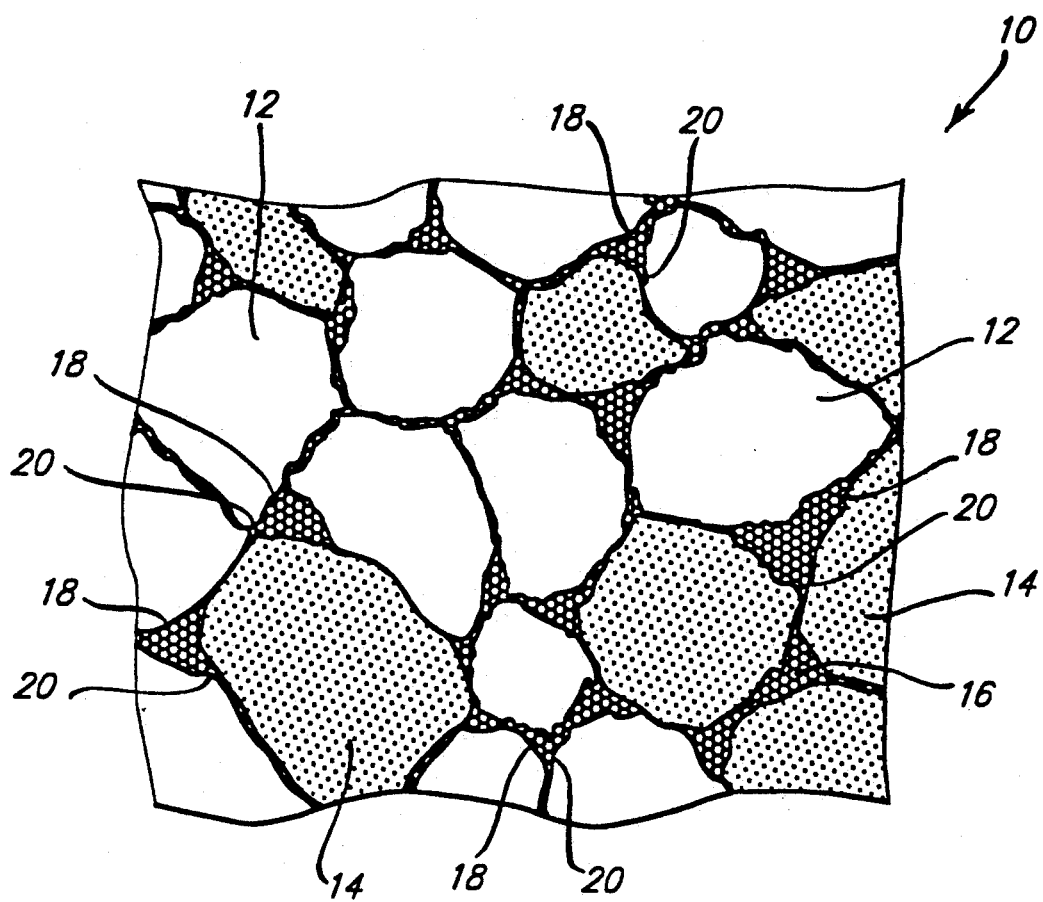
FIG. 1 is a schematic illustration in cross-section of the microstructure of the material of an article in accordance with one embodiment of the invention, illustrating the segregation of the metal phase at the triple points.

The fully dense ceramic materials described herein include two hard phases, a first hard phase of alumina combined with a second hard phase of one or more refractory carbides, nitrides, carbonitrides, or borides. As used herein, the term "alumina" is intended to mean that the alumina may (or may not) be further modified by or coexist with small amounts, i.e. less than 5%, of magnesia, zirconia, yttria, hafnia, and/or silica. An example of such an addition is the addition of a small amount of MgO as a grain growth inhibiting agent.

Examples of suitable materials for the second phase are the hard refractory carbides, nitrides, or borides of Groups IVB, VB, and VIB of the Periodic Table of the Elements. The preferred second hard phase materials are carbides and nitrides of titanium, zirconium, hafnium, vanadium, niobium, tantalum, chromium, molybdenum, and tungsten; titanium diboride; boron carbide; and combinations (i.e. mixtures and solid solutions) thereof. Most preferred as the second hard phase are titanium carbide, titanium nitride, hafnium carbide, hafnium nitride, tantalum carbide, tantalum nitride, tungsten carbide, titanium diboride, or boron carbide, or combinations thereof. The first hard phase is present in the material in an amount of about 44-93% by volume, while the second hard phase is present in an effective amount of about 4-44% by volume. Carbide content exceeding about 44% significantly increases the chemical solubility of, e.g., a cutting tool material with respect to ferrous alloys, resulting in poor performance. Carbide additions of less than about 4% result in decreased toughness, decreasing impact and wear resistance in applications such as milling.

The hard phases coexist with a third, intermetallic phase combining nickel and aluminum, in an amount of about 2-20% by volume of the starting formulation, preferably about 2-12 v/o, and most preferably about 4-12 v/o.

It is essential for optimization of this material, e.g. for use as a cutting tool, that this third phase include both nickel and aluminum. The metal powder added to the starting formulation includes nickel in an amount of about 85-88% by weight, and aluminum in an amount of about 12-15% by weight, both relative to the total weight of the metal powder. Since nickel does not wet alumina, the addition of aluminum in an amount of less than about 12% can result in a material of inferior properties. The material becomes more difficult to sinter, and the dispersion of the nickel in such a material is poor, tending to segregate. Conversely, the addition of aluminum in an amount greater than about 15% can lower the hardness and chemical stability of the material, also resulting in inferior properties. A minor amount of titanium, zirconium, hafnium, vanadium, niobium, tantalum, chromium, molybdenum, tungsten, cobalt, boron and/or carbon, not to exceed about 5% by weight of total metal phase, may also be included. The preferred composition is 12-14% by weight Al, balance Ni. In the most preferred compositions the Ni:Al ratio results in the formation of a substantially $Ni_3Al$ metal phase, having $Ni_3Al$ ordered crystal structure, and preferably is present in an amount of about 40-80 v/o. The $Ni_3Al$ ordered crystal structure may be substantially completely of the $Ni_3Al$ ordered crystal structure, or this phase may be only partially developed and exist in combination with one or more nickel-aluminum alloys. In some compositions, this ordered crystal structure may coexist with or be modified by the above-mentioned additives.

Thus, as used herein, the term "metal phase" does not necessarily denote a single phase.

The best combination of properties (hardness and fracture toughness) for the articles described herein, particularly for cutting tool applications, is obtained when total metal addition is in the most preferred range of about 4-12 v/o. The beneficial effect of such low amounts of the intermetallic phase is particularly unexpected, since at such lower amounts this phase is less likely to be acting as a continuous binder for the hard phases in a manner similar to known cermets, e.g. tungsten carbide/cobalt materials.

A preferred microstructure for the ceramic-metal articles described herein is schematically illustrated in FIG. 1. FIG. 1 shows ceramic-metal material 10, including alumina hard phase 12, titanium carbide hard phase 14, and metal phase 16. The metal phase is dispersed, non-continuous, and substantially segregated at "triple points" of the material, i.e. at points where the surfaces of at least three grains come together or would contact one another if the metallic phase were not present in the fully dense material. FIG. 1 shows metal phase 16 as segregates 18 disposed at triple points 20 between hard phase grains 12 and/or 14. These finely divided segregates are made up of a combination of Ni-Al alloys with the intermetallic $Ni_3Al$ compound. The segregation is effected by adding nickel and aluminum to the above described material, e.g. an oxide-carbide system, as nickel and aluminum powders rather than as the prereacted $Ni_3Al$ compound. Since nickel and nickel-rich Ni-Al alloys wet alumina poorly, the metal phase tends to segregate at the triple points.

The preferred average grain size of the hard phases in a densified body of this material for cutting tool use is about 0.5-5.0 μm; the most preferred, 1-3 μm. In other articles for applications where strength requirements are lower. e.g. sand blasting nozzles, a larger range of grain sizes for the second hard phase, e.g. about 0.5-20 μm, may prove satisfactory. The granular second phase may be present in the form of equiaxed particles or in non-equiaxed form, e.g. whiskers, fibers, or elongated grains, or as a mixture of two or more forms. Preferably, the average aspect ratio (length:diameter) of the second phase is between 1:1 and 20:1. The material may be densified by methods known to be suitable for alumina-based materials, for example sintering, continuous cycle sinterhip, two step sinter-plus-HIP, or hot pressing, all known in the art.

For certain applications such as cutting tools the articles described herein may be coated with refractory materials to provide certain desired surface characteristics. The preferred coatings have one or more adherent, compositionally distinct layers of refractory metal carbides and/or nitrides, e.g. of titanium, tantalum, or hafnium, and/or oxides, e.g. of aluminum or zirconium, or combinations of these materials as different layers and/or solid solutions. Especially preferred for the alumina-based material is an alumina coating, because of its inherent compatibility with its substrate. An alumina coating provides exceptional chemical stability, wear resistance, and high hardness at high temperatures.

Such coatings may be deposited by methods such as chemical vapor deposition (CVD) or physical vapor deposition (PVD), and preferably to a total thickness of about 0.5-10 μm. CVD or PVD techniques known in the art to be suitable for coating alumina are preferred for coating the articles described herein.

Coatings of alumina, titanium carbide, titanium nitride, titanium carbonitride, hafnium carbide, hafnium nitride, or hafnium carbonitride are typically applied by CVD. The other coatings described above may be applied either by CVD techniques, where such techniques are applicable, or by PVD techniques. Suitable PVD techniques include but are not limited to direct evaporation and sputtering. Alternatively, a refractory metal or precursor material may be deposited on the above-described bodies by chemical or physical deposition techniques and subsequently nitrided and/or carburized to produce a refractory metal carbide, carbonitride, or nitride coating. Useful characteristics of the preferred CVD method are the purity of the deposited coating and the enhanced layer adherency often produced by diffusional interaction between the layer being deposited and the substrate or intermediate adherent coating layer during the early stages of the deposition process.

For certain applications, for example cutting tools, combinations of the various coatings described above may be tailored to enhance the overall performance, the combination selected depending, for cutting tools, on the machining application and the workpiece material. This is achieved, for example, through selection of coating combinations which improve adherence of coating to substrate and coating to coating, as well as through improvement of microstructurally influenced properties of the substrate body. Such properties include hardness, fracture toughness, impact resistance, and chemical inertness of the substrate body.

The following Examples are presented to enable those skilled in the art to more clearly understand and practice the present invention. These Examples should not be considered as a limitation upon the scope of the present invention, but merely as being illustrative and representative thereof.

EXAMPLES 1-11

Cutting tools were prepared from a powder mixture of 8% by volume metal (86.7% Ni, 13.3% Al, both by weight, corresponding to a $Ni_3Al$ stoichiometric ratio), 27.6% by volume refractory carbide, balance alumina as follows:

The charge listed in Table I except for alumina was milled in a 500 cc capacity tungsten carbide attritor mill using cemented carbide (WC-Co) milling media for 1 hr at 120 rpm. $Al_2O_3$ powder was then added to the charge, which was further milled for 2½ hr.

After milling, the powder was separated from the milling media by washing with additional heptane through a stainless steel screen. The excess heptane was slowly evaporated. To prevent inhomogeneity, the thickened slurry was mixed continuously during evaporation, and the caking powder broken up with a plastic spatula into small, dry granules. The dry granules were then sieved through an 80-mesh screen.

TABLE I

| Component | Starting Powder Size | Amount |
| --- | --- | --- |
| Al | <1 μm | 1.75 g |
| Ni | ≈2 μm | 11.39 g |
| TiC | ≈2 μm | 32.64 g |
| Aluminum Oxide* | ≈0.05 μm | 61.38 g |
| Carbon | — | 0.0158 g |
| Heptane | — | 150 cc |

*$Al_2O_3$ powder included 0.05 weight % MgO.

The screened powder was then densified using a hot pressing technique. A 1.3 in diameter boron nitride washed die was charged with 31.5 g of the screened powder mixture, and was hot pressed at 1550° C. for 30 min at 31.1 MPa, then oven cooled to room temperature. The material was then removed from the dies. The fully dense material exhibited segregation of the metal phase at triple points in the microstructure.

Cutting tools prepared by the above-described process exhibited significantly improved mechanical properties when compared with similarly fabricated tools of an alumina/titanium carbide composite material, as shown in Table II. Table II shows the average values of the rupture strength, the Knoop hardness, and the fracture toughness of a commercial grade alumina-based composite ceramic tool including 30% titanium carbide, and of the cermet tools prepared as described above, including 27.6% titanium carbide. Also shown in Table II are the average values for tools prepared in a manner similar to that described above, including other second phase materials.

TABLE II

| Ex. | Composition | Density, g/cc | Rupture Strength, MPa | Knoop Hardness, GPa | Fracture Toughness, MPa.m$^{\frac{1}{2}}$ |
| --- | --- | --- | --- | --- | --- |
| 1* | $Al_2O_3$ + 30 v/o** TiC Commercial Grade | — | ≈500 | 15.22 | 3.16 |
| 2 | $Al_2O_3$*** + 27.6 v/o TiC (2 μm powder) + 8 v/o (Ni,Al) | 4.47 | 909 | 16.07 | 3.84 |
| 3 | $Al_2O_3$*** + 27.6 v/o W/C + 8 v/o (Ni,Al) | 7.55 | 878 | 15.71 | 4.73 |
| 4 | $Al_2O_3$*** + 27.6 v/o $TiB_2$ + 8 v/o (Ni,Al) | 4.51 | 698 | 16.49 | 3.13 |
| 5 | $Al_2O_3$*** + 27.6 v/o HfC + 8 v/o (Ni,Al) | 6.39 | 692 | 15.91 | 2.66 |
| 6 | $Al_2O_3$*** + | 4.09 | 725 | 15.90 | 3.28 |

TABLE II-continued

| Ex. | Composition | Density, g/cc | Rupture Strength, MPa | Knoop Hardness, GPa | Fracture Toughness, MPa.m$^{\frac{1}{2}}$ |
|---|---|---|---|---|---|
| 7 | 27.6 v/o B$_4$C + 8 v/o (Ni,Al) Al$_2$O$_3$*** + 27.6 v/o TaC + 8 v/o (Ni,Al) | 6.95 | — | 15.20 | 3.66 |
| 8 | Al$_2$O$_3$*** + 27.6 v/o NbC + 8 v/o (Ni,Al) | 5.21 | — | 14.99 | 3.07 |
| 9 | Al$_2$O$_3$*** + 27.6 v/o (W,Ti)C (1.3 μm powder) + 8 v/o (Ni,Al) | 5.14 | — | 16.68 | 2.80 |
| 10 | Al$_2$O$_3$*** + 27.6 v/o (W,Ti)C (2.3 μm powder) + 8 v/o (Ni,Al) | 5.06 | — | 16.76 | 3.38 |
| 11 | Al$_2$O$_3$*** + 27.6 v/o (W,Ti)C (3.5 μm powder) + 8 v/o (Ni,Al) | 5.17 | — | 16.80 | 2.99 |

*Comparative example.
**v/o = percent by volume.
***Al$_2$O$_3$ powder included 0.05 weight % MgO.
(Ni,Al) = A combination of nickel and aluminum in a Ni$_3$Al stoichiometric ratio.
(W,Ti)C = A cubic solid solution carbide of tungsten and titanium in a 50:50 tungsten to titanium ratio by weight.

As may be seen in Table II, the tools prepared as described herein compare favorably with the commercial tool, and most compositions are superior to the commercial tool in at least one property.

EXAMPLES 12-15

The performance of materials prepared in a manner similar to that described above was compared with a commercial grade cermet tool in flycutter milling using the test material as the flycutter tip. Rectangular steel workpieces, 1.5 inch wide and of Rockwell hardness 24, were milled without coolant using a standard flycutter mill at 750 ft/min, 0.125 in depth of cut. The centerline of the cutter was aligned with the centerline of the workpiece. The initial passing feed rate was preset at a value well below that expected to cause tool failure, then was increased in increments until fracture of the tool occurred. Each cutting tip was subjected to 340 impacts at each feed rate. The relative performance of the cutter tips is shown in Table III, with the passing feed rate shown therein indicating the feed rate at which fracture of the tool occurred.

TABLE III

| Example | Material | Passing Feed Rate, in/rev |
|---|---|---|
| 12* | Commercial Cermet Grade** | 4.2 |
| 13 | 8 v/o (Ni,Al)*** + 27.6 v/o TiC + 64.4 v/o Al$_2$O$_3$ | 6.7 |
| 14 | 8 v/o (Ni,Al)*** + 27.6 v/o WC + 64.4 v/o Al$_2$O$_3$ | 6.7 |
| 15 | 8 v/o (Ni,Al)*** + 27.6 v/o HfC + 64.4 v/o Al$_2$O$_3$ | 6.7 |

*Comparative example.
**Proprietary composition; includes Mo$_2$C, TiC, TiN, VC, WC with 10% nickel and 10% cobalt by weight as binder.
***(Ni,Al) = A combination of nickel and aluminum in a Ni$_2$Al stoichiometric ratio.
Al$_2$O$_3$ powder included 0.05 weight % MgO.

As may be seen in Table III, the tools according to the present invention exhibit significantly superior performance in flycutter milling when compared to the commercially available cermet tool, demonstrating the improvement in impact resistance of the tools described herein beyond the level attained with commercially available cermets. In most cases, this improvement is at least in part a result of the improved fracture toughness achieved in the tools described herein.

EXAMPLES 16-20

The performance of materials prepared in a manner similar to that described above and used as cutting tool inserts were also compared to that of a commercial grade cermet tool in turning tests. The tests involved the dry turning of 4340 steel at 700 ft/min, 0.010 in/rev, 0.050 in depth of cut. The wear values shown in Table IV are the averages of tool wear values from three corners.

As may be seen in Table IV, the tools according to the invention were superior in turning performance, exhibiting significantly superior wear performance and tool life when compared with the commercial cermet tool. This improvement is in part a result of the superior chemical wear resistance of the cermet tools according to the invention.

TABLE IV

| Example | Material | Nose Wear, in | Flank Wear, in | Metal Removed, in$^3$ |
|---|---|---|---|---|
| 16* | Commercial Cermet Grade** | 0.056 | 0.019 | *** |
| 17 | 8 v/o (Ni,Al) + 27.6 v/o TiC + 64.4 v/o Al$_2$O$_3$ | 0.007 | 0.007 | 36 |
| 18 | 8 v/o (Ni,Al) + 27.6 v/o WC + 64.4 v/o Al$_2$O$_3$ | 0.014 | 0.014 | 36 |
| 19 | 8 v/o (Ni,Al) + 27.6 v/o HfC + 64.4 v/o Al$_2$O$_3$ | 0.008 | 0.007 | 36 |
| 20 | 8 v/o (Ni,Al) + 27.6 v/o B$_4$C + | 0.021 | 0.018 | 36 |

TABLE IV-continued

| Example | Material | Nose Wear, in | Flank Wear, in | Metal Removed, in³ |
|---|---|---|---|---|
| | 64.4 v/o Al₂O₃ | | | |

*Comparative example.
**Proprietary composition; includes Mo₂C, TiC, TiN, VC, WC with 10% nickel and 10% cobalt by weight as binder.
***Failure of the tool after 4 in³ metal removed.
(Ni,Al) = A combination of nickel and aluminum in a Ni₃Al stoichiometric ratio. Al₂O₃ powder included 0.05 weight % MgO.

The present invention provides novel improved cutting tools capable of withstanding the demands of hard steel turning, which requires a high degree of wear resistance, and steel milling, which requires a high degree of impact resistance. It also provides wear parts and other structural parts of high strength and wear resistance.

While there have been shown and described what are at present considered the preferred embodiments of the invention, it will be obvious to those skilled in the art that various changes and modifications can be made therein without departing from the scope of the invention as defined by the appended Claims.

We claim:

1. A ceramic-metal article comprising:
   about 44-93% of a granular first hard phase consisting essentially of alumina and from 0% to less than 5% of one or more oxides selected from magnesia, zirconia, yttria, hafnia, and silica;
   about 4-44% of a granular second hard phase consisting essentially of one or more ceramic materials selected from the group consisting of the hard refractory carbides, nitrides, and borides, and combinations thereof; and
   about 2-20% of a metal phase consisting essentially of a combination of nickel and aluminum having a ratio of nickel to aluminum of from about 85:15 to about 88:12 by weight and 0-5% of an additive selected from the group consisting of titanium, zirconium, hafnium, vanadium, niobium, tantalum, chromium, molybdenum, tungsten, cobalt, boron, or carbon, or combinations thereof;
   wherein said article has a density of at least about 95% of theoretical, and all unspecified component percents are expressed in % by volume.

2. An article in accordance with claim 1 wherein said metal phase comprises about 4-12% of said article.

3. An article in accordance with claim 1 wherein said metal phase comprises a combination of a Ni₃Al ordered crystal structure, or a Ni₃Al ordered crystal structure coexistent with or modified by said additive, and one or more nickel-aluminum alloys.

4. An article in accordance with claim 3 wherein said metal phase combination comprises about 40-80 v/o of said Ni₃Al ordered crystal structure of said Ni₃Al ordered crystal structure coexistent with or modified by said additive.

5. An article in accordance with claim 1 wherein said first hard phase consists essentially of alumina and from 0% to less than 5% of magnesia.

6. An article in accordance with claim 1 wherein said one or more ceramic materials of said second hard phase are selected from the group consisting of the hard refractory carbides and nitrides of titanium, zirconium, hafnium, vanadium, niobium, tantalum, chromium, molybdenum, and tungsten; titanium diboride; boron carbide; and combinations thereof.

7. An article in accordance with claim 1 wherein said hard phases have an average grain size of about 0.5-20 μm.

8. An article in accordance with claim 1 wherein said article is coated with one or more adherent, compositionally distinct layers, each layer being a material or solid solution of materials selected from the group consisting of carbides, nitrides, and carbonitrides of titanium, tantalum, and hafnium, oxides of aluminum and zirconium, and diamond.

9. An article in accordance with claim 8 wherein said hard phases have an average grain size of about 1-3 μm, and said article is of a geometry suitable for use as a cutting tool.

10. A ceramic-metal article comprising:
    about 44-92% of a granular first hard phase consisting essentially of alumina and from 0% to less than 5% of one or more oxides selected from magnesia, zirconia, yttria, hafnia, and silica;
    about 4-44% of a granular second hard phase consisting essentially of one or more ceramic materials selected from the group consisting of hard refractory titanium carbide, hafnium carbide, tantalum carbide, tantalum nitride, tungsten carbide, titanium diboride, and boron carbide, and combinations thereof; and
    about 4-12% of a metal phase consisting essentially of a combination of nickel and aluminum having a ratio of nickel to aluminum of from about 85:15 to about 88:12 by weight and 0-5% of an additive selected from the group consisting of titanium, zirconium, hafnium, vanadium, niobium, tantalum, chromium, molybdenum, tungsten, cobalt, boron, and carbon, and combinations thereof;
    wherein said article has a density of at least about 95% of theoretical, and all unspecified component percents are expressed in % by volume.

11. An article in accordance with claim 10 wherein said metal phase comprises a combination of a Ni₃Al ordered crystal structure and one or more nickel-aluminum alloys, or a combination of a Ni₃Al ordered crystal structure coexistent with or modified by said additive and one or more nickel-aluminum alloys.

12. An article in accordance with claim 11 wherein said metal phase combination comprises about 40-80 v/o of said Ni₃Al ordered crystal structure or said Ni₃Al ordered crystal structure coexistent with or modified by said additive.

13. An article in accordance with claim 10 wherein said article is coated with one or more adherent, compositionally distinct layers, each layer being a material or solid solution of materials selected from the group consisting of carbides, nitrides, and carbonitrides of titanium, tantalum, and hafnium, oxides of aluminum and zirconium, and diamond.

14. An article in accordance with claim 13 wherein said hard phases have an average grain size of about 1-3 μm, and said article is of a geometry suitable for use as a cutting tool.

15. A ceramic-metal article in accordance with claim 6 wherein said one or more ceramic materials of said second hard phase have an average aspect ratio between 1:1 and 20:1.

16. A ceramic-metal article having a density of at least about 95% of theoretical, and comprising:
    about 88-98% by volume of granular hard phases consisting essentially of (a) a major hard phase portion consisting essentially of alumina with about 0–2% by volume of one or more oxides selected from the group consisting of magnesia, zirconia, yttria, hafnia, and silica; and (b) a minor hard phase portion selected from the group consisting of the hard refractory carbides, nitrides, carbonitrides, and borides, and combinations thereof; and about 2–12% by volume of a metal phase consisting essentially of (a) a combination of nickel and aluminum having a ratio of nickel to aluminum of from about 85:15 to about 88:12 by weight; and (b) 0–5% by volume of an additive selected from the group consisting of titanium, zirconium, hafnium, vanadium, niobium, tantalum, chromium, molybdenum, tungsten, cobalt, boron, and carbon, and combinations thereof; and wherein:

said metal phase is a non-continuous, dispersed metal phase; and at least a major portion of said non-continuous, dispersed metal phase is segregated at triple points defined by grain surfaces of said granular hard phases.

17. An article in accordance with claim 16 wherein said metal phase comprises about 4–12% by volume of said cutting tool.

18. An article in accordance with claim 16 wherein said metal phase comprises a combination of a $Ni_3Al$ ordered crystal structure and one or more nickel-aluminum alloys, or a combination of a $Ni_3Al$ ordered crystal structure coexistent with or modified by said additive and one or more nickel-aluminum alloys.

19. A method in accordance with claim 18 wherein said metal phase combination comprises about 40–80 v/o of said $Ni_3Al$ ordered crystal structure, or said $Ni_3Al$ ordered crystal structure coexistent with or modified by said additive.

* * * * *

UNITED STATES PATENT AND TRADEMARK OFFICE
CERTIFICATE OF CORRECTION

PATENT NO. : 5,271,758
DATED : Dec 21, 1993
INVENTOR(S) : Sergej T. Buljan, Helmut Lingertat, Steven F. Wayne It is certified that error appears in the above-indentified patent and that said Letters Patent is hereby corrected as shown below:

Col. 9, line 56, (Claim 4) " of " should be -- or --.

Signed and Sealed this

Twenty-ninth Day of August, 1995

Attest:

BRUCE LEHMAN

Attesting Officer      *Commissioner of Patents and Trademarks*